(12) United States Patent
Tuck et al.

(10) Patent No.: US 7,219,788 B2
(45) Date of Patent: May 22, 2007

(54) VARIABLE CAPACITY STORE FOR ELONGATED ARTICLES

(75) Inventors: Henry W. Tuck, Hertfordshire (GB); Terry W. Lock, Milton Keynes (GB); Clive Wright, Kent (GB)

(73) Assignee: Flexlink Components AB (SE)

( * ) Notice: Subject to any disclaimer, the term of this patent is extended or adjusted under 35 U.S.C. 154(b) by 0 days.

(21) Appl. No.: 10/550,261

(22) PCT Filed: Mar. 22, 2004

(86) PCT No.: PCT/SE2004/000419

§ 371 (c)(1),
(2), (4) Date: Sep. 22, 2005

(87) PCT Pub. No.: WO2004/085293

PCT Pub. Date: Oct. 7, 2004

(65) Prior Publication Data

US 2006/0225989 A1    Oct. 12, 2006

(30) Foreign Application Priority Data

Mar. 25, 2003  (GB) ................................ 0306823.6

(51) Int. Cl.
*B65G 37/00* (2006.01)
(52) U.S. Cl. ............................... 198/347.2; 198/347.4; 198/812

(58) Field of Classification Search ............. 198/347.1, 198/347.2, 347.3, 347.4, 812
See application file for complete search history.

(56) References Cited

U.S. PATENT DOCUMENTS

| | | | | |
|---|---|---|---|---|
| 2,932,376 | A * | 4/1960 | Millington | ............ 198/341.03 |
| 4,513,858 | A * | 4/1985 | Fellner et al. | .............. 198/812 |
| 6,065,585 | A | 5/2000 | Bryant et al. | |
| 6,422,380 | B1 | 7/2002 | Sikora | |
| 6,591,963 | B2 * | 7/2003 | Wipf | ........................ 198/347.2 |
| 6,725,998 | B2 * | 4/2004 | Steeber et al. | ........... 198/347.4 |

FOREIGN PATENT DOCUMENTS

| | | |
|---|---|---|
| DE | 27 44 446 A1 | 4/1979 |
| EP | 0 738 478 A2 | 10/1996 |
| GB | 2 143 788 A | 2/1985 |
| WO | WO-02/085144 A | 10/2002 |

* cited by examiner

*Primary Examiner*—James R. Bidwell
(74) *Attorney, Agent, or Firm*—Lerner, David, Littenberg, Krumholz & Mentlik, LLP

(57) ABSTRACT

A variable capacity storage unit is disclosed comprising a set of independent conveyor belts superpositioned on top of each other and connected to operate as a single storage unit. The conveyor belts are arranged in a generally H-shaped pattern including two parallel elongated portions and a transverse portion, which is movable along the elongated portions, and include a transfer belt for converting the active portions of each of the conveyor belts into a single unit.

6 Claims, 12 Drawing Sheets

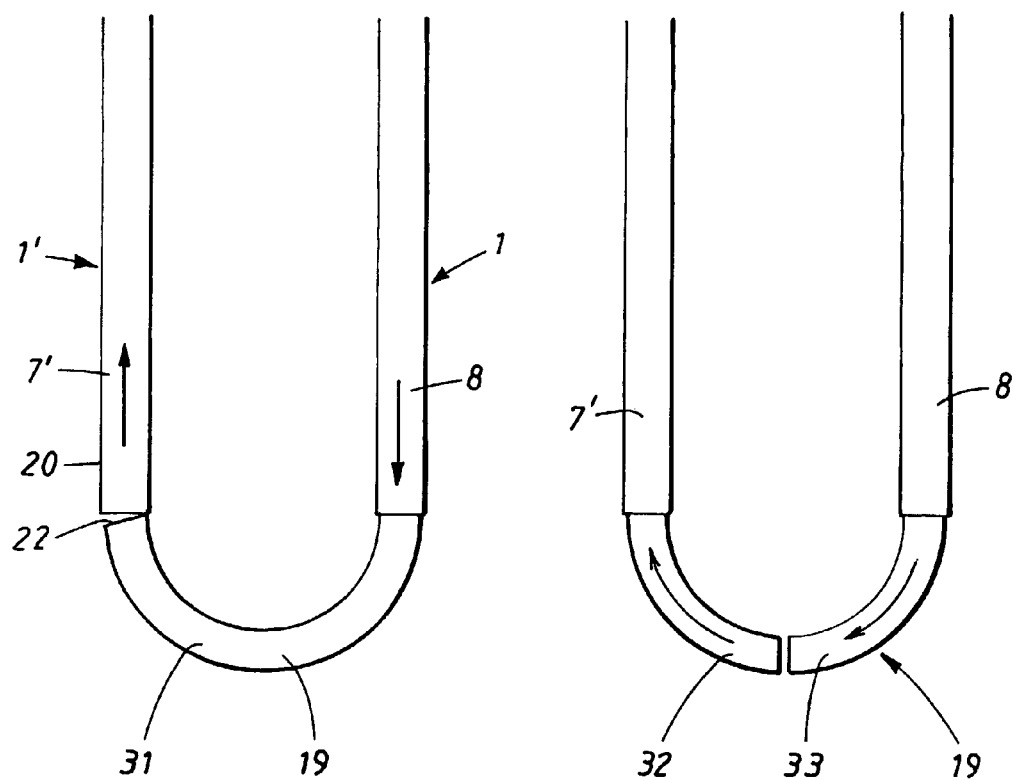

VARIABLE CAPACITY STORE FOR ELONGATED ARTICLES

TECHNICAL FIELD

The present invention relates to a variable capacity store for elongated articles. In particular the invention relates to a variable capacity store of the FIFO type, where goods stored in the reservoir leave the store in the same order as they were introduced. Furthermore the invention relates to the type of variable capacity store which includes an endless conveyer being subdivided into an active path, which is capable of transporting goods and a passive path functioning as a store for the endless conveyor. In this type of variable capacity stores, the capacity is altered by changing the length of the active path by removing part of the active path from the passive path or by introducing part of the passive path into the active path.

BACKGROUND ART

A variable capacity store for elongated articles where an endless conveyer is subdivided into an active path and a passive path is previously known from EP 738478. EP 738478 discloses a variable-capacity store for elongated articles. The store comprises an input station and an output station located in series along a path along which elongated articles are fed. The articles are fed by a single endless conveyor, which is subdivided into an active path and a passive path. The active path extends from the input station to the output station and the passive path extends from the output station to the input station. The active path is formed by a part of the endless conveyor, which is wound around a first set of drums in a first spiral. The passive path, or return branch, is formed by a part of the endless conveyor, which is wound around a second set of drums in a second spiral.

A drawback of the variable capacity store of the above type is that the transfer between the active path and passive path is performed at a single point, which is where the endless conveyer leaves the first spiral to enter the second spiral or vice versa, in dependence of whether the active path should be lengthened or shortened. The friction between the drums and the endless conveyer will increase as the number of turns increases from the point of entrance where the active and passive paths are connected. This implies that, when trying to change the division between the active path and passive path, by removing part of the active path from the passive path or by introducing part of the passive path into the active path, the tension of the chain will increase from the point of entrance where the active and passive paths are connected as the number of turns increases. When a reservoir is used in a process which has relatively large short term variations in the capacity of a delivering device, which is arranged to feed the reservoir, and a receiving device, which is arranged to be fed by the reservoir, it is of importance that the capacity of the reservoir can be altered quickly. A limiting factor in this regard, is that the endless conveyor is designed to support a maximum tension. The tension in the endless conveyor is dependent on the velocity of the change of length of the active and passive path. Since the tension in the endless conveyor increases as the number or turns increases, the maximum feed in-feed or feed out velocity from the active path will be determined from the tension in the chain at the last turn, calculated from the point of entrance. For a conveyor of a determined rigidity, there will be a maximum number of turns allowed for a specific maximum feed in-feed or feed out velocity from the active path. If the designer would need more turns in order to create a larger variable capacity store, the designer would have to contemplate to make a more rigid conveyor, which in turn would increase the weight of the chain and thus require a complete redesign of the store.

DISCLOSURE OF INVENTION

One object of the invention is to provide a variable capacity store in which allow a freedom in design of the number of layers in an active path without a corresponding increase in tension of the chain as the number of turns increases, such that the response to short term variations cab be quick even for relatively large stores comprising a plurality of turns in the active path.

This object is achieved by a variable capacity store according to the characterising portion of claim 1. The invention relates to a variable capacity store comprising a set of conveyor means superpositioned on top of and connected to each other. Since a number of conveyor means are superpositioned on top of each other, the capacity of the store can be designed by deciding how many layers should be used. Since each layer works independently from the other layers of the store, the addition of a layer does not alter the design of the layers already present in the store. This type of store can therefore be redesigned in order to meet changed requirements of capacity only by adding a layer and replacing the input or output station of the store, depending on which side the additional layer is positioned. The other parts of the store do not need to be altered. Each layer is formed by a conveyor means.

The invention makes use of conveyor means includes an endless conveyor being arranged in a generally H-shaped pattern including two parallel elongated portions and a transverse portion, which is movable along said elongated portions. The H-shaped pattern is, by said transverse portion, divided into an active path positioned one side of the transverse portion and a passive path positioned on the other side, wherein the capacity of the conveyor means is arranged to be varied by displacing the transverse portion and thereby increasing or decreasing the proportion between the active path and passive path.

Since the layers are formed by essentially a single endless conveyor, the tension in an endless conveyor in one layer will be independent of the tension in an endless conveyor in another layer. It is therefore possible to arrange a store with a multiplicity of layers without a corresponding increase in tension of the chain as the number of layers increases, such that the response to short term variations cab be quick even for relatively large stores comprising a plurality of layers.

The H-shaped endless conveyors are connected to each other by transfer means arranged between said active paths of conveyor means. The transfer means is preferably formed by a curved conveyor path extending from an end of an elongated portion on one side of a first generally H-shaped endless conveyor toward an end of an elongated portion on the opposite side of a second generally H-shaped endless conveyor positioned on top of said first generally H-shaped endless conveyor.

In a still further preferred embodiment the curved conveyor path is formed by an extension of the generally H-shaped endless conveyor in one or both of two interconnected conveyor means superpositioned on top of and connected to each other.

In yet another preferred embodiment of the invention each transverse portion in the set of conveyor means is individually displaceable along the elongated portions of the H-shaped conveyor means, such that the capacity of each conveyor means in said set of conveyor means is controlled independently from the capacity of other conveyor means in said set. This embodiment is particularly advantageous since even if the drive for change of position of the transverse portion is stuck or becomes inoperative for some other reason, the capacity of the store will be variable, due to the variation of the capacity of the remaining layers.

The invention also relates to a variable store arrangement comprising a first and a second variable capacity store as described above. According to this embodiment the active paths together with the transfer means of the first variable capacity store forms a first conveyor path which is arranged to perform transportation of goods from one conveyor means to the next conveyor means in said set of conveyor means in a first direction. Furthermore, the active paths together with the transfer means of the second variable capacity store forms a second conveyor path which is arranged to perform transportation of goods from one conveyor means to the next conveyor means in said set of conveyor means in a second direction opposite to said first direction.

In the embodiment, the active paths together with the transfer means of the second variable capacity store forms a second conveyor path which is arranged to perform transportation of goods from one conveyor means to the next conveyor means in said set of conveyor means in a second direction opposite to said first direction.

The elongated portions of the second variable capacity store are positioned between the elongated portions of the first variable capacity store and the transfer means of the second variable capacity store is positioned between the transfer means and the transverse portion of the second variable capacity store, whereby the first conveyor path is essentially circumventing the second transportation path.

A variable store arrangement arranged as indicated above provides is very compact, by which is meant that a large amount of goods can be stored on a relatively small area, furthermore, the input and output to the store arrangement can be arranged at approximately the same height. This is an advantage, if a production in a factory is done in essentially a single plane. In this case, the need for a lift or a downdrop, which normally would follow a variable capacity store where the input and output is arranged at different heights is removed.

Preferably, the generally H-shaped patterns of said first variable capacity store is vertically displaced from said generally H-shaped patterns of said second variable capacity store. By this arrangement, the transverse portions of respective first and second variable capacity store is prevented from colliding with each other.

BRIEF DESCRIPTION OF DRAWINGS

Embodiments of the invention will be described in detail below, with references to the appended drawings, where:

FIG. 7 shows a second embodiment of transfer means.

MODE(S) FOR CARRYING OUT THE INVENTION

Figure 1:
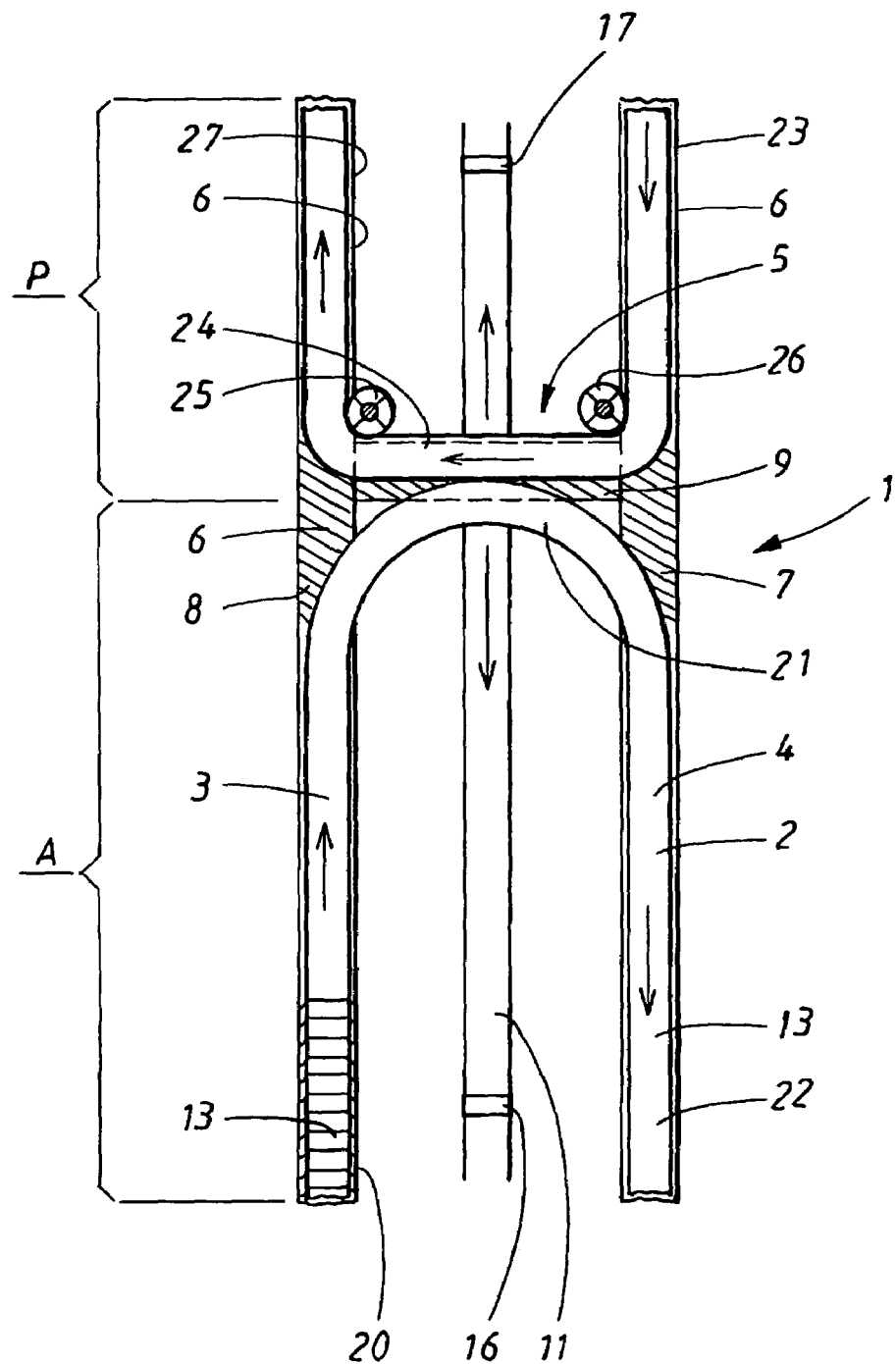
FIG. 1 shows a top view of a conveyor means including an endless conveyor being arranged in a generally H-shaped pattern.

In FIG. 1 a top view of a conveyor means 1 is shown. The conveyor means 1 is intended to be used in a variable capacity store including a plurality of layers, each including a conveyor means 1, superimposed on top of each other. The conveyor means 1 includes an endless conveyor 2 being arranged in a generally H-shaped pattern including two parallel elongated 3, 4 portions and a transverse portion 5. The endless conveyor 2 rests on a frame 6. The frame includes a first and a second parallel support rails 7,8 and a transverse support bar 9. The parallel support rails 7,8 are arranged to support the parallel elongated portions 3, 4 of the endless conveyor and the support bar 9 is arranged to support the transverse portion 5.

The transverse support bar 5 is movably arranged along the length of the parallel support rails 7,8. By movement of the transverse support bar 9, the position of the transverse portion of the endless conveyer 2 will be altered. Movement of the transverse support bar 9 is accomplished by a drive motor 10 (FIG. 3), which engages a guide bar 11 extending in the same direction as the support rails 7,8. The transverse support 9 bar is slidably arranged in the support rails 7,8 by engagement of a notch (not shown) in a longitudinally extending groove 12 (FIG. 3) in a side portion of the support rail 7,8. In order to limit the movement of the transverse support bar 9 end stops 16, 17 can be provided at respective end of the guide bar 11.

The endless conveyor 2 is by said transverse portion 5, divided into an active path A positioned one side of the transverse portion and a passive path P positioned on the other side. The endless conveyor 2 enters at a first end 20 of the first support rail, where, according to the embodiment shown in FIG. 1, the conveyer 2 is flexed, from running on the bottom side 14 of the first support rail 7, to run in the opposite direction on the top side 13 of the first support rail 7. The conveyer 2 runs toward the transverse support bar 9, which supports a curved transverse portion 21 of the conveyer 2. The curved transverse portion 21 of the conveyer 2 can be arranged in a manner known to the skilled in the art, for example via a curved track or by locally flexing the conveyers at the ends of the transverse support bar 9. The conveyer leaves the transverse support bar 9 to be supported by the second support rail 8.

The conveyer further extends toward a first end 22 of the second support rail 8, where the conveyer 2 is flexed from running on the top side 13 of the second support rail 8 to run in the opposite direction on the bottom side 14 of the second support rail 8. The conveyer further runs on the bottom side 14 of the second support rail 8 toward a second end portion 23 of the second support rail 8, where the conveyer 2 is flexed, from running on the bottom side 14 of the second support rail 8, to run in the opposite direction on the top side 13 of the second support rail 8. The conveyer 2 further runs toward the transverse support bar 9, where a flexed transverse portion 24 of the conveyer 2, which is included in the passive path P, it is flexed toward the first support rail 7. The flexed transverse portion 24 of the conveyer 2 can be arranged in a manner known to the skilled in the art, for example by locally flexing the conveyers by roller wheels 25, 26 at the ends of the transverse support bar 9 as shown in the embodiment shown in FIG. 1 or via a curved track. Leaving the flexed transverse portion 24, the conveyer 2 further extends toward a second end 27 of the first support rail 7. At the second end 27 of the first support rail, the conveyer is flexed from running on the top side 13 of the first support rail 7 to run in the opposite direction on the bottom side 14 of the first support rail 7. The conveyer further runs on the bottom side 14 of the first support rail 7 toward the first end portion 20 of the first support rail 7, where the conveyer 2 is flexed, from running on the bottom side 14 of the first support rail 7, to run in the opposite direction on the top side 13 of the first support rail 7, where it first entered.

The transverse support bar supports the curved transverse portion 21 and the flexed transverse portion 24 of the conveyer. The active path A includes the portion of the conveyor 2 extending from the first end 20 of the first support rail 7 to the first end 22 of the second conveyer 8. The active path A also includes the curved transverse portion 21. Furthermore the active path A includes transfer means 19 (FIGS. 4–7) connecting active paths of conveyor means of different layers of conveyor means.

The passive path P includes the portions 28, 29 (FIG. 2) of the conveyer 2 which extends along the bottom side 14 of the first and second support rails 7,8. Furthermore, the passive path P includes the portion of the conveyor which extends from the second end 23 of the second support rail 8 to the second end 27 of the first support rail 7. This portion includes the flexed portion 24, which is carried by the transverse support bar.

By changing the position of the transverse support bar 9 along the support rails 7,8, the relative proportion between the active path A and passive path P is changed.

Figure 2:
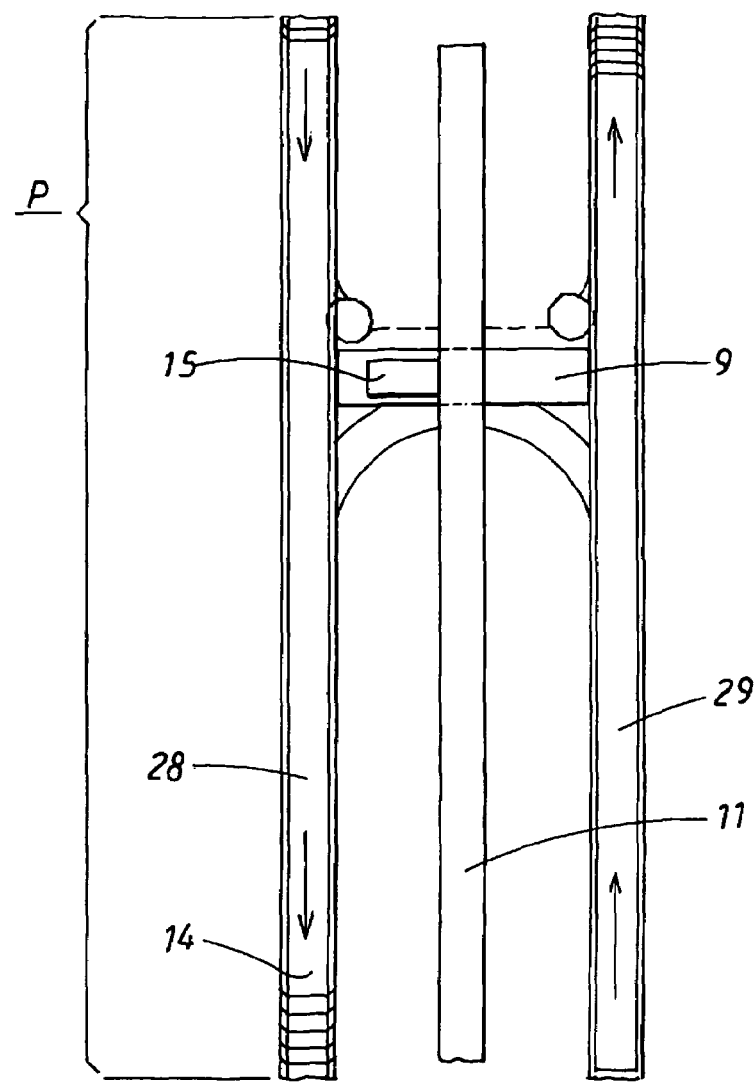
FIG. 2 shows a view form below of the conveyor shown in FIG. 1.

In FIG. 2, the conveyer means shown in FIG. 1 is shown from a view below. The bottom side 14 of the first and second support rails 7,8 carries portions 28, 29 of the conveyer, which form part of the passive path P. Furthermore the guide bar 11 extending along the length of the support rails 7,8 is shown. The bottom side of the transverse support bar 9 carries a drive motor 15 for changing the position of the transverse support bar 9 via engagement to a guide bar 11.

Figure 4:
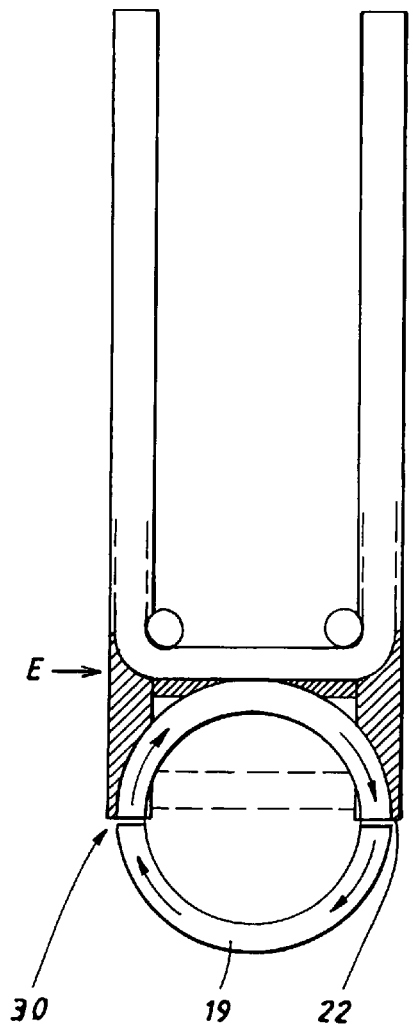
FIG. 4 shows a top view of the conveyor in FIG. 1, where the transverse portion is moved to an end position, wherein the storage capacity is at a minimum for the store and a first embodiment of transfer means for transferring gods from one layer to another layer in the set of H-shaped endless conveyors stacked on top of each other.

In FIG. 4 a top view of the conveyor in FIG. 1 is shown, where the transverse support bar 9 is moved to an end position E, wherein the storage capacity is at a minimum for the store. Furthermore a first embodiment of transfer means 19 for transferring goods from one layer to another layer in the set of H-shaped endless conveyors stacked on top of each other is attached at an end 30 of the conveyor means 1 on which the active path A is situated. In the shown embodiment the transfer means 19 is formed by a separate curved conveyor, which preferably is arranged as an endless conveyor. The transfer means 19 is attached to outgoing portion of the endless conveyor 2 where, that is at the first end 22 of the second support rail 8, where a transfer from the active path A on the top side 13 of the second support rail 8 to the passive path P on the bottom side 14 occurs. The transfer means, which is included in the active path A, lead toward the first end 20' of the first support rail 7' of a conveyor means 1' postioned on top of the conveyor means 1 shown in FIG. 4.

Figure 5:
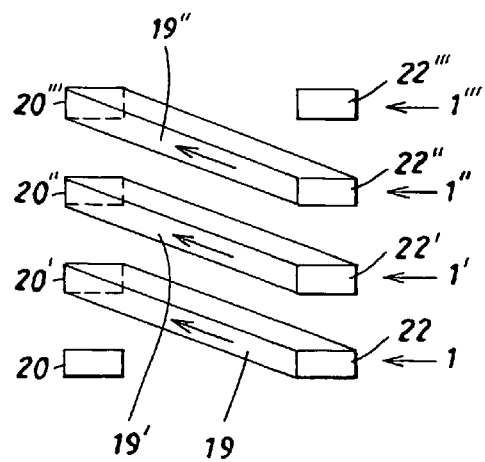
FIG. 5 shows an end view of a set of H-shaped conveyers stacked on top of each other, where transfer means are arranged to transfer the goods from one layer to another.

In FIG. 5 an end view of a set of conveyer means, including a first-1, a second-1', a third 1" and a fourth-1''' conveyor means, which are positioned on top of each other are shown. A first, second and third transfer means 19, 19', 19" are arranged for connecting the active paths A, A', A", A''' of respective conveyer means.

In FIG. 6 a first alternative embodiment of the transfer means 19 is shown. Here the second support rail 8 is extended and comprises a curved portion 31. The curved portion 31 is also inclined upwards in a vertical direction such that it connects the incoming end 20' of the first support rail 7' in a conveyor means 1' positioned on top of the conveyor means 1, which carries the curved portion. The first end 22 of the second support rail is adjoined to the first end 20' of the first support 7' of the conveyor means 1' such that a transfer from a first conveyor means 1 to a second conveyor means 1' positioned on top of said first conveyor means is possible.

Instead of extending the second support rail 8 it is possible to prolong the first support rail. In this case the first support rail 7' of the second conveyor means 1' would be extended and would comprise a curved portion. The curved portion would be inclined downwards in a vertical direction such that it connects the outgoing end 22 of the second support rail 8 in a conveyor means 1 positioned below the conveyor means 1', which carries the curved portion.

FIG. 7 show a third embodiment of the transfer means 19. According to this embodiment both the first guide rail 7' of a second conveyer means 1' and the second guide rail 8 of the first conveyor means are extended to include curved portions 32, 33. The curved portions are positioned such that the connect each other such that transfer between respective conveyor means are possible.

According to the invention the transfer means can be either formed as separate means such as shown in FIG. 4 or by extension of the first guide rail, the second guide rail or both the first and second guide rail in a manner so as to connect the outgoing end of a conveyor means with an incoming end in another conveyor means positioned on top. An incoming end is an edge portion of a conveyor means where an endless conveyor flexes from the bottom off a guide rail to the top of the guide rail at a position where the conveyor on the topside is running from the edge.

Figure 8:
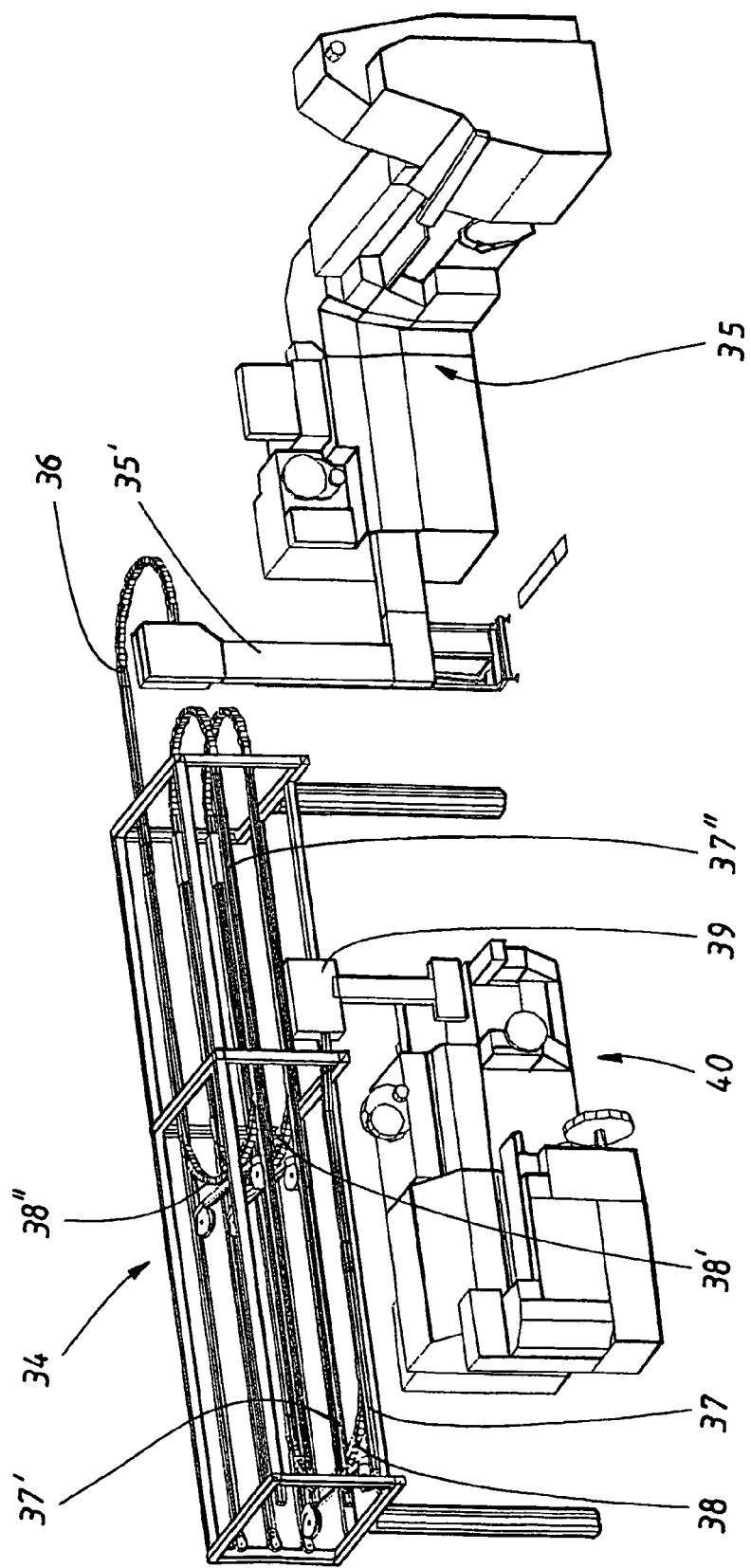
FIG. 8 shows a third embodiment of transfer means.

FIG. 8 shows a variable capacity store 34 according to the invention in use as a variable capacity store for elongated articles. The store is fed with elongated articles, in particular tobacco products from a manufacturing unit 35. The elongated articles are elevated by an elevator unit 35' to the top level of the variable capacity store 34. The elongated articles enters the variable capacity store 34 at an input track 36, which in this example is positioned at the highest conveyor means 37" in a set of three conveyer means 37–37". In a preferred embodiment of the invention, the transverse portions 38–38"in said set of conveyor means 37–37" is individually displaceable along said elongated portion, such that the capacity of each conveyor means in said set of conveyor means is controlled independently from the capacity of other conveyor means in said set. In the example shown the lowest conveyor is positioned such that the active path is as large as possible, while the two remaining transverse portions are positioned midways. Naturally, the invention also contemplates the possibility to run the transverse portions in pairs or altogether fixed together for simultaneous movement. However, according to the most preferred embodiment the transverse portions are individually moveable for maximum flexibility of the storage capacity.

Figure 3:
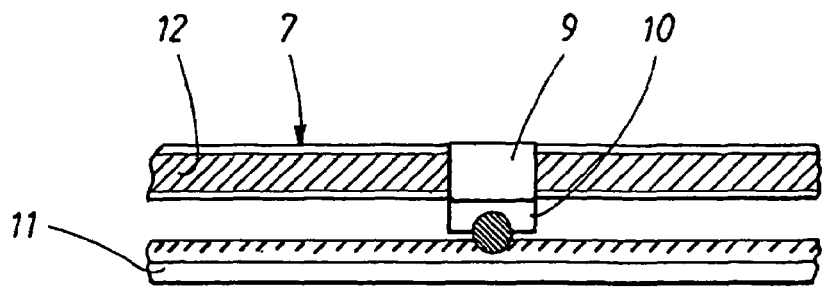
FIG. 3 shows a side view of a conveyor means including a drive means for a support for the transverse portion of the H-shaped conveyor means.

The positions of the transverse portions 38–38" are controlled by drive units connected to guide rails as explained in connection with FIG. 3. Respective endless conveyor are driven by a single drive unit (not shown) or by a single drive unit which is connected to respective endless conveyer by a transmission.

The goods leave the variable capacity store at an output station 39, which in the shown example is positioned at the bottom of the variable capacity store. From the output station the goods enters a packing machine 40.

Figure 9:
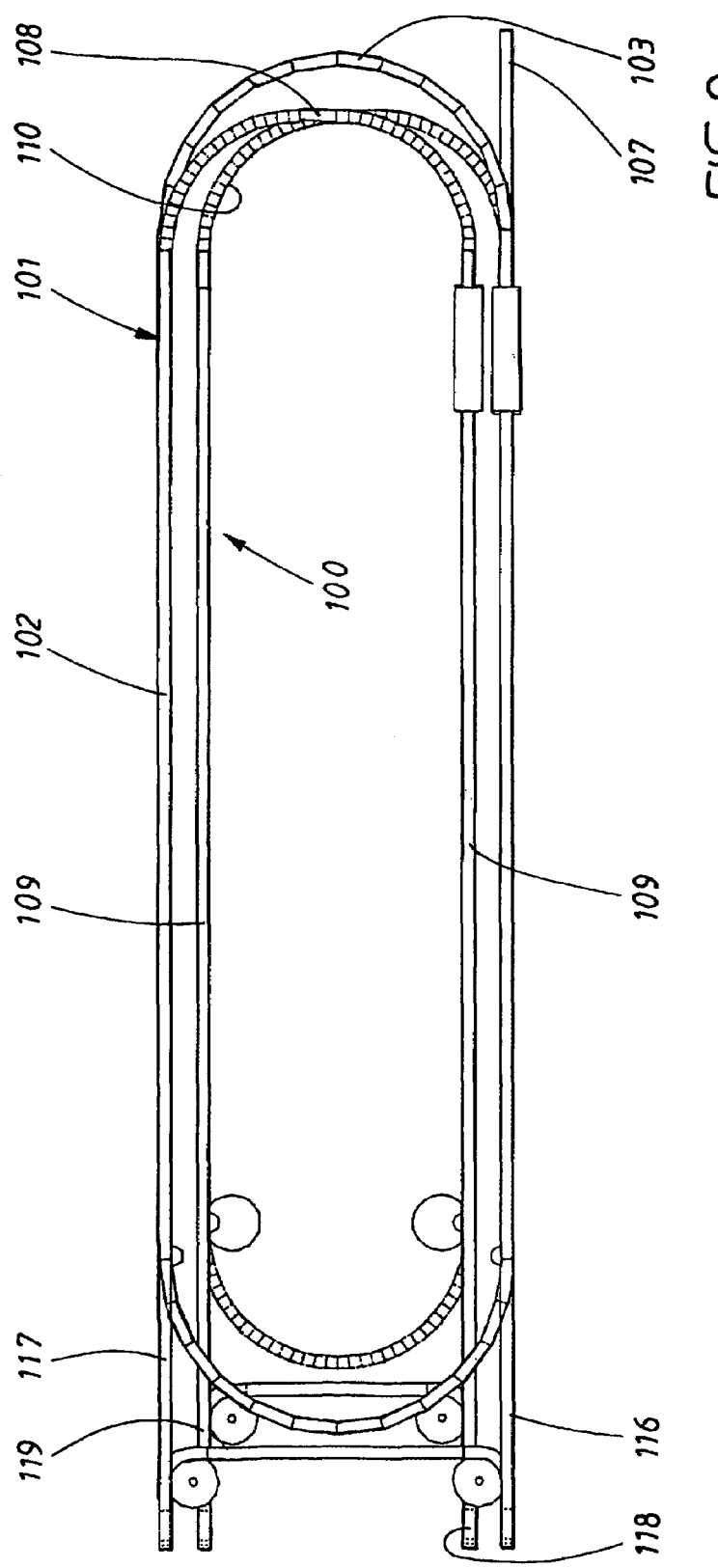
FIG. 9 shows a top view of an embodiment of a variable store, including an inner and an outer variable capacity store, where both variable capacity stores are full, FIG. 10 show a perspective view of the outer variable store only, FIG. 11 show a perspective view of the inner variable store only.
Figure 10:
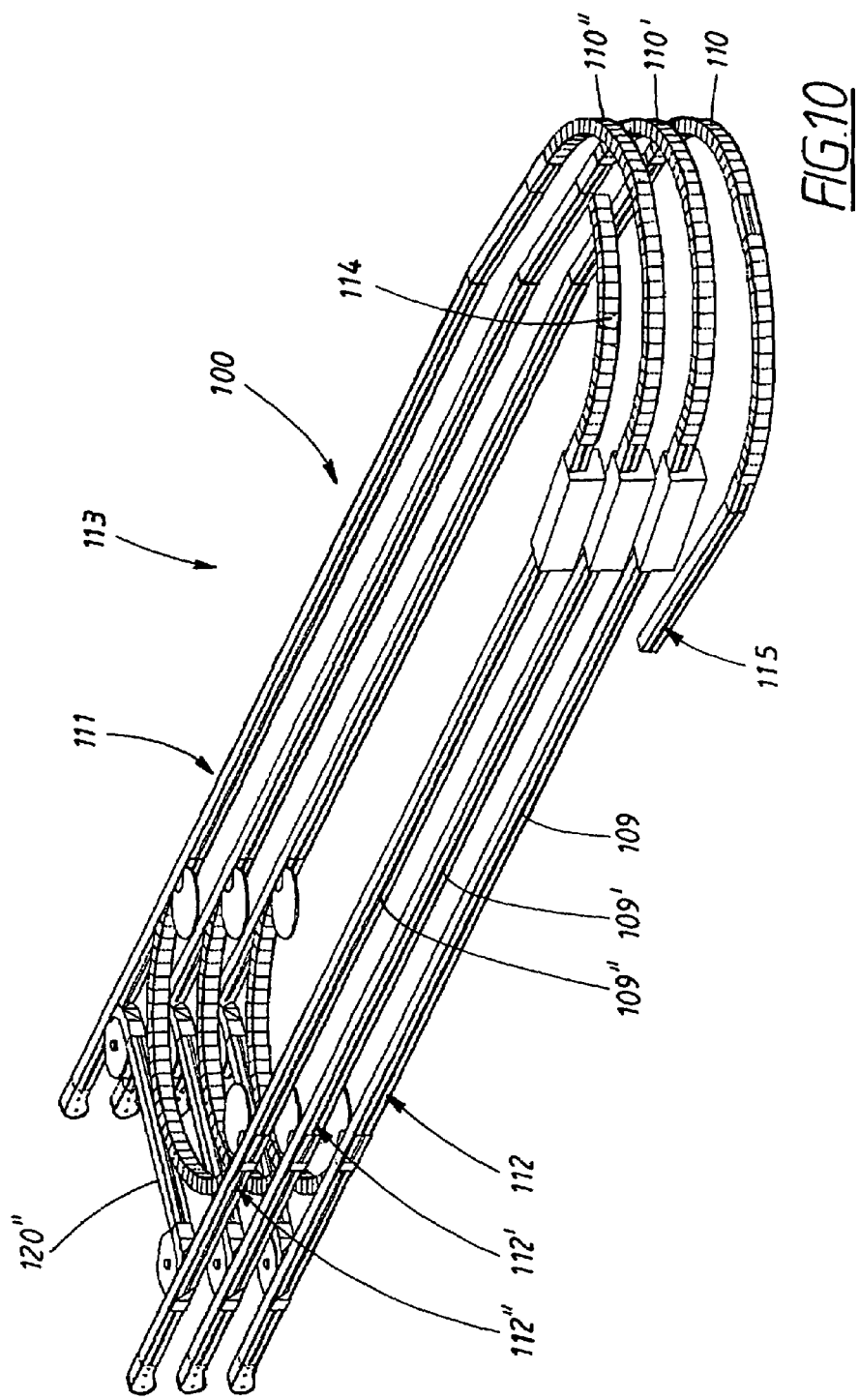

In FIG. 9 a top view of an embodiment of a variable store, including an inner variable capacity store 100 and an outer variable capacity store 101 is shown. In FIG. 10 it is shown how the active paths 102, 102', 102" together with the transfer means 103,103', 103" of the first outer variable capacity store 101 forms a first conveyor path 104. The first transport path 104 is arranged to perform transportation of goods from one conveyor means 105 to the next conveyor means 105' etc. in a set (105–105") of conveyor means in a first direction indicated with arrow 106 in an upward route of track. Each transport means (105–105") and the transfer means 103, 103', 103" between the transport means are arranged in the manner described above. The set (105–105") of conveyor means includes an infeed track 107, where goods are delivered to the variable capacity store, and an exit path 108, which leads to an inner variable capacity store 100.

Figure 11:
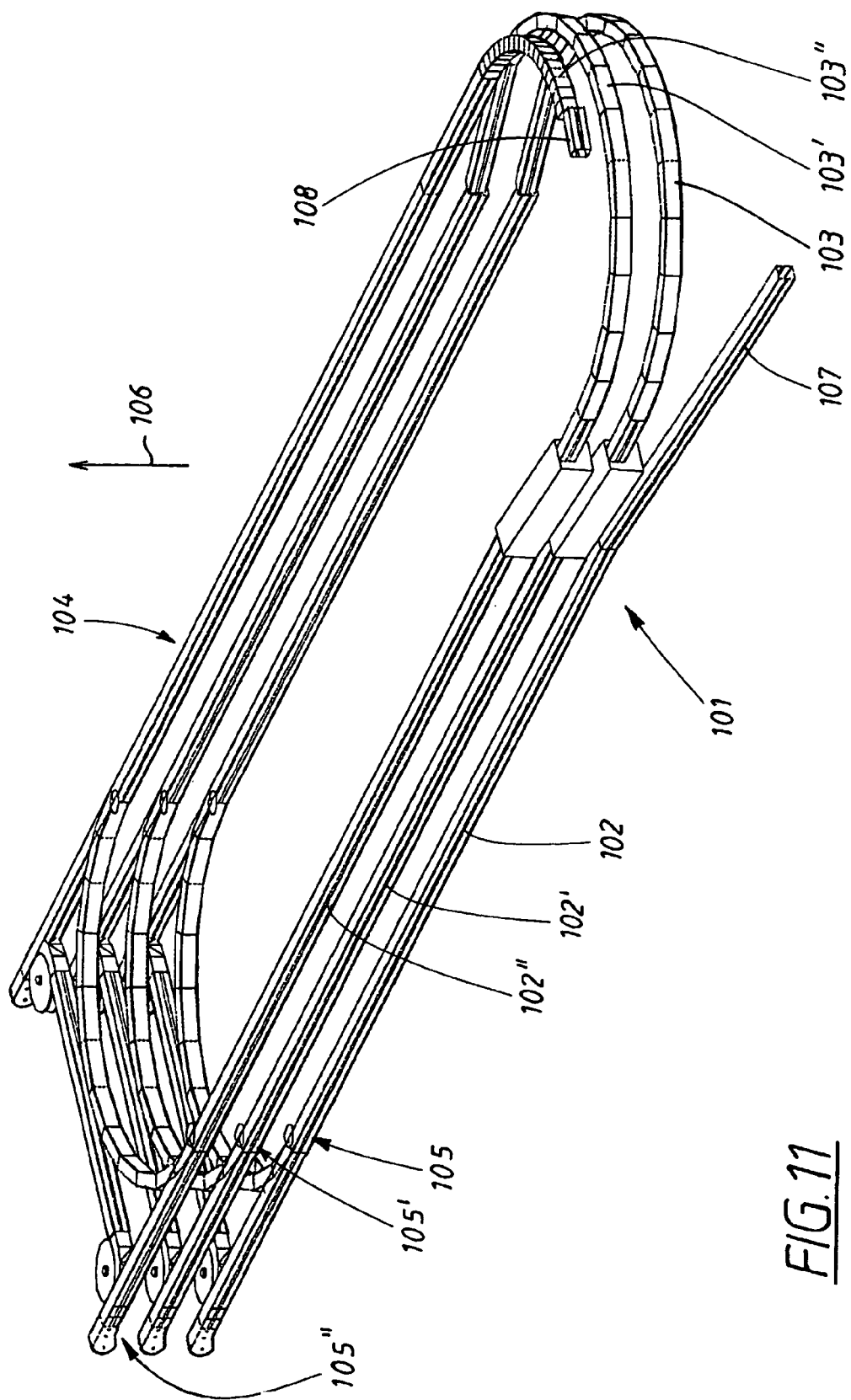

In FIG. 11 it is shown how the active paths 109, 109' 109" together with the transfer means 110, 110', 110" of the second inner variable capacity store 100 forms a second conveyor path 111. The second conveyor path 111 is arranged to perform transportation of goods from one conveyor means 112" to the next conveyor means 112' in a set of conveyor means (112–112") in a second direction opposite to said first direction in a downward route of track. The second direction is indicated with an arrow 113. Each transport means (112–112") and the transfer means 110,110', 110" between the transport means are arranged in the manner described above. The set (112–112") of conveyor means includes an infeed track 114 which receives from the outer variable capacity store 101 and an exit track 1 15, where goods are delivered from the variable capacity store.

The first outer variable capacity store includes elongated portions 116, 117. The second inner variable capacity store includes similar elongated portions 118 , 119. The elongated portions 118, 119 of the second inner variable capacity store 100 are positioned between the elongated portions 116, 117 of the first variable capacity store 101.

Furthermore the transfer means 110 of the second inner variable capacity store 101 is positioned between the transfer means 103 and the transverse portions 120–120" of the first outer 101 variable capacity store.

The first conveyor path is thus essentially circumventing the second transportation path.

Figure 12:
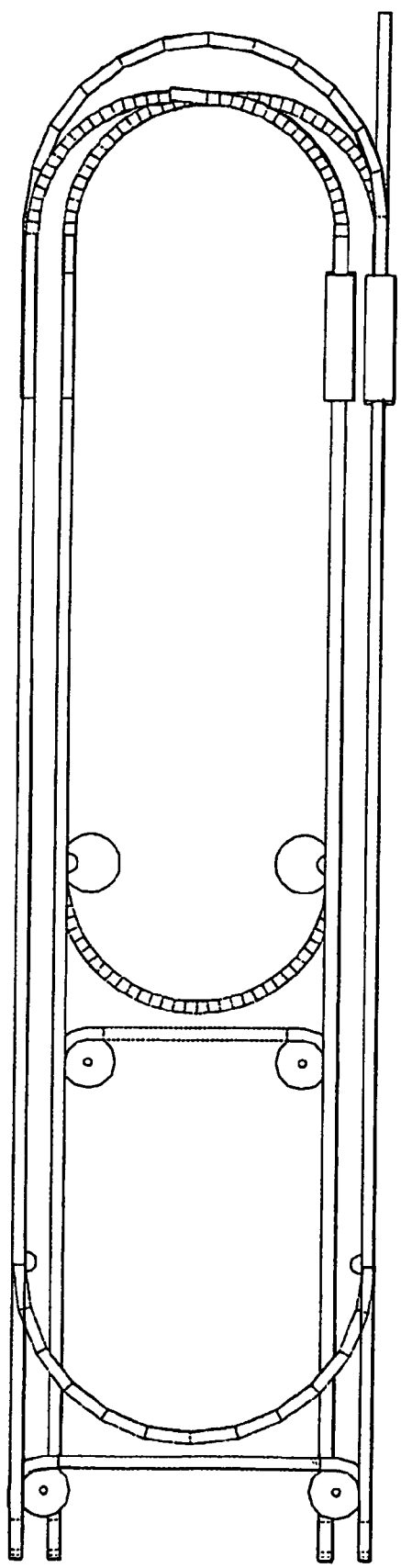
FIG. 12 shows a top view of an embodiment of a variable store, including an inner and an outer variable capacity store, where the outer variable capacity store is full and the inner variable capacity store is half full.
Figure 13:
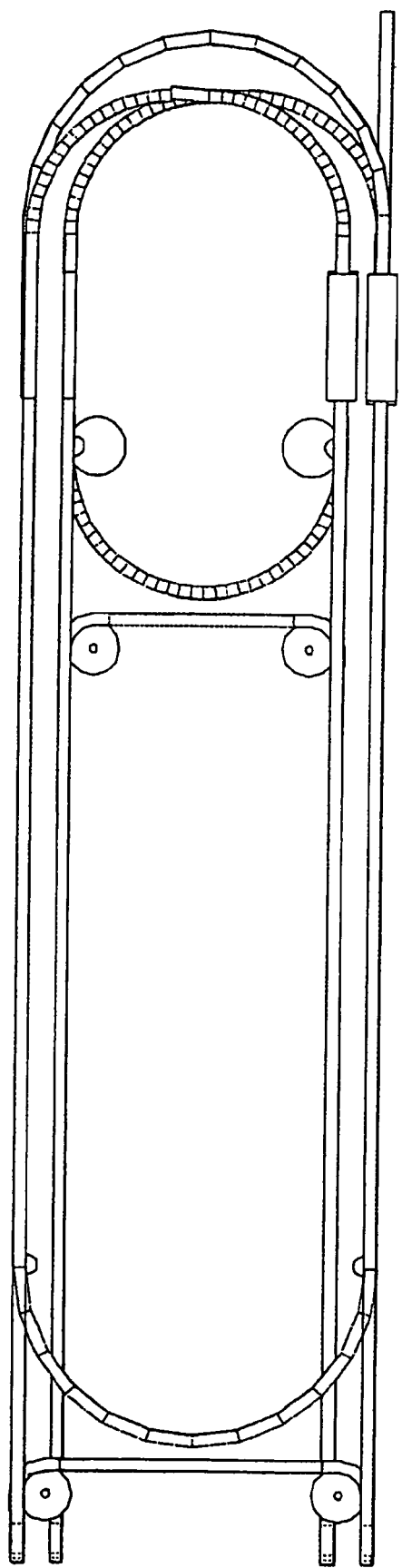
FIG. 13 shows a top view of an embodiment of a variable store, including an inner and an outer variable capacity store, where the outer variable capacity store is full and the inner variable capacity store is empty.
Figure 14:
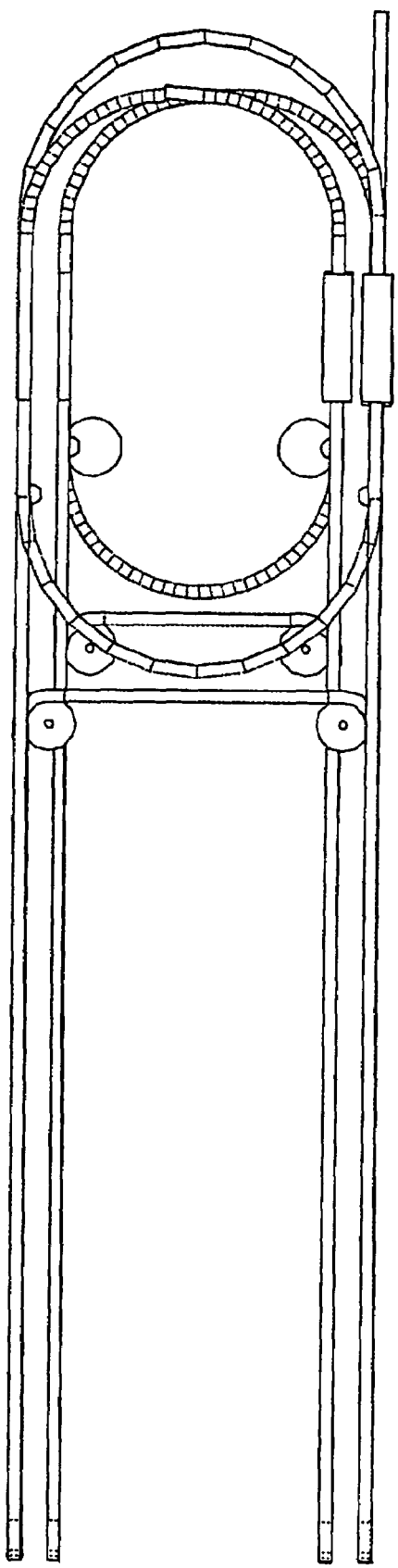
FIG. 14 shows a top view of an embodiment of a variable store, including an inner and an outer variable capacity store, where the outer variable capacity store and the inner variable capacity store are empty.

FIGS. 12–14 show a top view of an embodiment of a variable store, including an inner and an outer variable capacity store, where the inner and outer capacity stores are filled to different levels.

Figure 15:
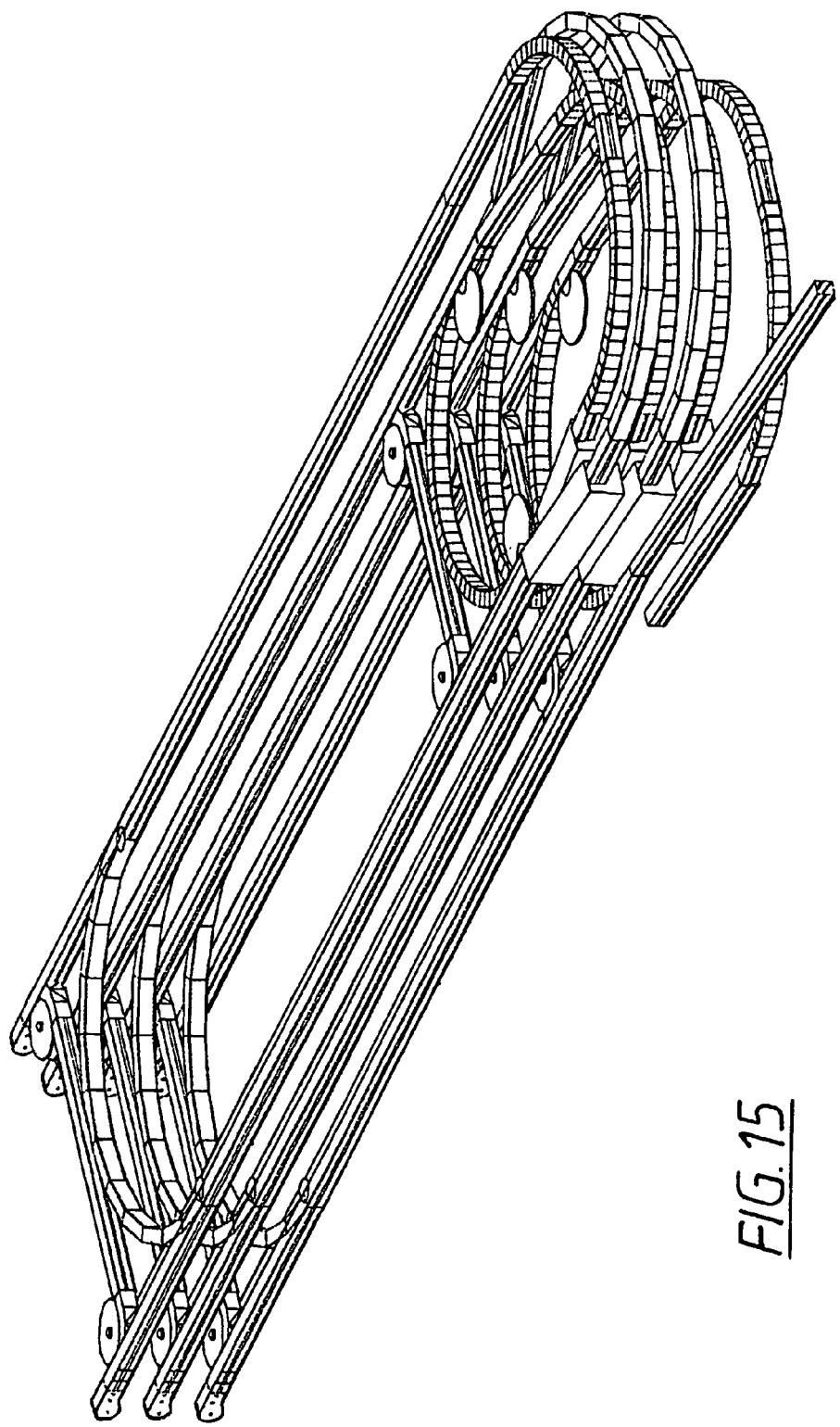
FIG. 15 shows a perspective view of an embodiment of a variable store arrangement including an inner and an outer variable capacity store.

FIG. 15 show a perspective view of a variable store, including an inner and an outer variable capacity store.

FIGS. 12–15 includes the same features as explained in relation to FIGS. 9–11 and will therefore not be described in full detail.

The invention shall not be restricted to the embodiments described above, but can be varied within the scope of the appended claims.

The invention claimed is:

1. A variable capacity storage unit comprising a plurality of independent conveyor means connected to operate as a single storage unit, each of said plurality of conveyor means comprising an endless conveyor arranged in a generally H-shaped pattern including a first elongated portion, a second elongated portion parallel to said first elongated portion, and a transverse portion movable along said first and second elongated portions dividing said generally H-shaped pattern into an active path on one side of said transverse portion and a passive path on the other side of the transverse portion, and transfer means for connecting said plurality of active portions to each other, whereby the storage capacity of said conveyor means can be varied by displacing at least one of said plurality of transverse portions to alter the proportion between said active path and said passive path in at least one of said plurality of independent conveyor means.

2. The variable capacity storage unit of claim 1 wherein said transfer means comprises a curved conveyor extending from one of said plurality of first elongated portions to another of said plurality of second elongated portions located above said one of said plurality of first elongated portions.

3. The variable capacity storage unit of claim 2 wherein at least a portion of said curved conveyor comprises an extension of one of said plurality of first elongated portions and said another of said plurality of second elongated portions.

4. The variable capacity storage unit of claim 1 wherein each of said plurality of transverse portions is independently displaceable along said one of said first and second elongated portions associated therewith, whereby the capacity of each of said plurality of conveyor means is independently controllable.

5. A variable storage arrangement comprising a first variable capacity storage unit comprising a first plurality of independent conveyor means connected to operate as a single storage unit, each of said first plurality of independent conveyor means comprising an endless conveyor arranged in a generally H-shaped pattern including a first elongated portion, a second elongated portion parallel to said first elongated portion, and a first transverse portion movable along said first and second elongated portions dividing said generally H-shaped pattern into an active path on one side of said first transverse portion and a passive path on the other side of said first transverse portion, and first transfer means for connecting said plurality of active paths to each other, whereby the storage capacity of said first plurality of independent conveyor means can be varied by displacing at least one of said first transverse portions to alter the proportion between said active path and said passive path, and a second variable capacity storage unit comprising a second plurality of independent conveyor means connected to operate as a single storage unit, each of said second plurality of independent conveyor means comprising an endless conveyor arranged in a generally H-shaped pattern including a third elongated portion, a fourth elongated portion parallel to said third elongated portion, and a second transverse portion movable along said third and fourth elongated portions dividing said generally H-shaped pattern into an active path on one side of said second transverse portion and a passive path along the other side of said second transverse portion, and second transfer means for connecting said plurality of active paths to each other whereby the storage capacity of said second plurality of independent conveyor means can be varied by displacing at least one of said second transverse portions to alter the proportion between said active paths and said passive paths, wherein said first variable capacity storage unit is adapted to transport goods between said first plurality of independent conveyor means in a first direction, and said second variable capacity storage unit is adapted to transport said goods between said second plurality of independent conveyor means in a second direction opposite to said first direction, said third and fourth elongated portions being positioned between said first and second elongated portions and said second transfer means being positioned between said first transfer means and said plurality of second transverse portions whereby said plurality of first independent conveyor means substantially circumvents said plurality of second independent conveyor means.

6. The variable capacity storage unit of claim 5 wherein said generally H-shaped patterns of said first variable capacity storage unit are vertically displaced from said generally H-shaped patterns of said second variable capacity storage unit.

* * * * *